Patented Oct. 31, 1933

1,933,217

UNITED STATES PATENT OFFICE 1,933,217

MANUFACTURE OF DIAMINODIPHENYL-DISULPHIDES

Robert Lantz, Paris, France, assignor of one-half to Societe Anonyme Des Matieres Colorantes & Produits Chimiques De Saint-Denis, Paris, France No Drawing. Application July 20, 1931, Serial No. 552,066, and in France August 1, 1930

12 Claims. (Cl. 260—16)

The present invention relates to the manufacture of diaminodiphenylsulphides having the general formula:

in which R is a benzene nucleus either substituted or not, with which the S and NH$_2$ groups are respectively connected in the ortho or para positions. The method according to the present invention consists in starting from a body having the general formula Cl—R—NO$_2$ in which R is a benzene nucleus to which Cl and NO$_2$ are connected in ortho or para positions with respect to each other. The last mentioned body is caused to react on a suitable amount of sodium sulphide or another soluble sulphide, and the product thus obtained is subsequently oxidized. It is probable that there is formed an intermediary product which is a aminothiophenol. The formation of the last mentioned body can be explained by the following formula:—

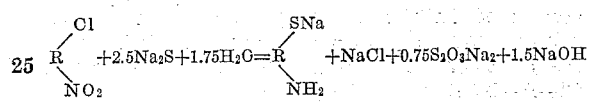

In this equation R represents a benzene nucleus which may or may not contain substituents, the group Cl and NO$_2$ occupying positions 1:2 or 1:4.

In general, the proportion of sulphide which gives the best results is that theoretically necessary, that is to say 2.5 molecules per molecule of the chloronitrobenzene. In most cases, the reaction is best carried out in aqueous solution.

It is to be noted that at least in theory the reaction may be separated into two phases, the first consisting of a substitution and the second of a reduction, according to the equations:

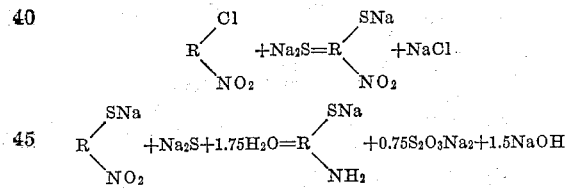

It has been found that for the sulphide used for the reduction (second equation) there may be substituted a corresponding quantity of sodium disulphide or sodium hydrosulphide.

Instead of sodium sulphide, soluble sulphides of other metals may be used.

The solution of the aminothiophenol thus obtained may be used for the oxidation; it is then generally unnecessary to precipitate the product.

The oxidation may be affected advantageously by atmospheric oxygen and becomes rapid in a medium which is neutral or feebly alkaline. It is commercially important to conduct the oxidation in the liquid in which the thiophenol was prepared, preferably after it has been partially or completely neutralized.

The following examples illustrate the invention:

*Example 1.*—An aqueous solution of 492 grams of crystallized sodium sulphide in 1230 cc. of water, to which has been added 123 grams of para-chloronitrobenzene, is boiled for 7 hours. The para-chloraniline thus formed in small proportion is carried away by the steam. After cooling there is added sodium bicarbonate to neutralize the caustic alkali and then the liquid is oxidized by air. There is rapidly formed a precipitate consisting of needle shaped crystals of para-dithioniline, very nearly pure. The yield is excellent.

Recrystallization from aqueous alcohol yields a product melting at 78° C. In like manner ortho-dithioaniline is made by starting from orthochloronitrobenzene, which ortho-dithioaniline when recrystallized from aqueous alcohol melts at 93° C. Under the same conditions, para-dichloro-ortho-dithioaniline is obtained by starting from paradichloronitrobenzene, which paradichloro-ortho-dithioaniline melts at 119° C.

*Example 2.*—Into a solution of 164 grams of crystallized sodium sulphide in 410 cc. of water, there are introduced in a single operation and at the ordinary temperature, 50.5 grams of 1-chloro-2 : 4-dinitrobenzene dissolved in 630 cc. of alcohol. The solution thus obtained is oxidized by a current of air. A precipitate is formed which is purified by dissolution in acetic acid and reprecipitation by water, then by dissolution in hot alcoholic hydrochloric acid, filtration and precipitation of the filtrate by ammonia. The product crystallized from nitrobenzene melts at 210° C. and consists of the disulphide of 2 : 2'-dinitro-4 : 4'-diaminodiphenyl, identical with that obtained by Muller (Zeitschrift für Farben Industrie 1906 pages 357–361).

*Example 3.*—A mixture of 7.85 grams of para-chloro-nitrobenzene, 1.6 grams of sulphur and an aqueous solution of 24 grams of crystallized sodium sulphide in 75 cc. of water is boiled for 4 hours. That solution is treated and oxidized in the same way as in Example 1.

What I claim is:

1. A method of preparing diaminodiaryldisulphides (dithioanilines) having the general formula:

$$S-R-NH_2$$
$$S-R-NH_2$$

in which R is a benzene nucleus to which S and NH₂ are respectively connected in any relative positions except the meta position, which comprises causing a soluble salt of hydrosulphuric acid to react with a body having the general formula:

$$Cl-R-NO_2$$

in which R is a benzene nucleus to which Cl and NO₂ are respectively connected in any relative positions except the meta position, and subsequently oxidizing the product of that reaction.

2. A method of preparing diaminodiaryldisulphides (dithioanilines) having the general formula:

$$S-R-NH_2$$
$$S-R-NH_2$$

in which R is a benzene nucleus to which S and NH₂ are respectively connected in relative ortho position which comprises causing a soluble salt of hydrosulphuric acid to react with a body having the general formula:

$$Cl-R-NO_2$$

in which R is a benzene nucleus to which Cl and NO₂ are respectively connected in relative ortho position, and subsequently oxidizing the product of that reaction.

3. A method of preparing diaminodiaryldisulphides (dithioanilines) having the general formula:

$$S-R-NH_2$$
$$S-R-NH_2$$

in which R is a benzene nucleus in which S and NH₂ are respectively connected in relative para positions which comprises causing a soluble salt of hydrosulphuric acid to react with a body having the general formula:

$$Cl-R-NO_2$$

in which R is a benzene nucleus to which Cl and NO₂ are respectively connected in relative para position, and subsequently oxidizing the product of that reaction.

4. A method of preparing 4′ diaminodiphenyldiphenyldisulphide (paradithioaniline) which comprises adding para-chloronitrobenzene to a solution of a salt of hydrosulphuric acid, allowing said bodies to react on each other, and oxidizing the product of said reaction.

5. A method of preparing 2.2′ diaminodiphenyl disulphide (orthodithioaniline) which comprises adding ortho-chloronitrobenzene to a solution of a salt of hydrosulphuric acid, allowing said bodies to react on each other, and oxidizing the product of the reaction.

6. A method of preparing dinitro 2.2′ diamino 4.4′ diphenyldisulphide, which comprises adding 1-chloro-2 : 4-dinitrobenzene to a solution of a salt of hydrosulphuric acid, allowing said bodies to react on each other, and oxidizing the product of said reaction.

7. A method according to claim 1 wherein for each molecule of the body whose formula is Cl—R—NO₂ about 2.5 molecules of sodium sulphide are used.

8. A method according to claim 1 wherein for each molecule of the body whose formula is Cl—R—NO₂ about one molecule of sodium sulphide and 1.5 molecule of sodium hydrosulphide are used.

9. A method according to claim 1 wherein for each molecule of the body whose formula is Cl—R—NO₂ about 2 molecules of sodium sulphide and one atom of sulphur are used.

10. A method of preparing dithioanilines according to claim 1 in which the reaction is conducted in an aqueous medium.

11. A method of preparing dithioanilines according to claim 1 wherein oxidation is produced by air in a non-acid medium.

12. A method of preparing dithioanilines according to claim 1 in which the oxidation is conducted in the liquor in which the soluble salt of hydrosulphuric acid has been caused to react upon the body whose formula is Cl—R—NO₂.

ROBERT LANTZ.